United States Patent
Seibert et al.

(10) Patent No.: US 10,491,458 B2
(45) Date of Patent: Nov. 26, 2019

(54) SYSTEM AND METHOD FOR REPORTING PEER-TO-PEER TRANSFER EVENTS

(71) Applicant: Dell Products L.P., Round Rock, TX (US)

(72) Inventors: Philip M. Seibert, Austin, TX (US);
Yuan-Chang Lo, Austin, TX (US);
Jason A. Shepherd, Austin, TX (US);
Raziuddin Ali, Austin, TX (US);
Claude Lano Cox, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 558 days.

(21) Appl. No.: 13/755,227

(22) Filed: Jan. 31, 2013

(65) Prior Publication Data

US 2014/0215052 A1 Jul. 31, 2014

(51) Int. Cl.
*H04L 12/24* (2006.01)

(52) U.S. Cl.
CPC .................................. *H04L 41/069* (2013.01)

(58) Field of Classification Search
CPC ... H04L 67/104; H04L 12/66; H04L 41/0803;
H04L 63/1408; H04L 67/108; H04L 67/06; H04L 2463/101; H04L 63/1416; H04L 65/4076; H04L 65/602; H04L 65/4084; H04L 65/80; H04L 69/329; H04L 29/08306; H04L 29/08477; H04L 29/12009; H04L 29/12047; H04L 67/1051; H04L 67/14; H04L 67/24; H04L 67/142; H04L 65/1066; H04L 43/08; H04L 65/102; H04L 67/02; H04L 63/1425; H04L 63/10; H04L 2012/2849;
H04L 67/1063; H04L 67/1068; H04L 45/42; H04L 43/10; H04L 43/0811; H04L 67/1091; H04L 67/1046; H04L 63/0428; H04L 67/1044; H04L 47/20; H04L 47/22; H04L 9/0822; H04L 9/0833; H04L 67/1093; H04L 43/065; H04L 1/22; H04L 41/0663; H04L 41/0668; H04L 67/1065; H04L 67/1076;

(Continued)

(56) References Cited

U.S. PATENT DOCUMENTS 6,892,210 B1 * 5/2005 Erickson et al.
7,441,153 B1 * 10/2008 Chitre et al. ............... 714/38.14

(Continued)

OTHER PUBLICATIONS http://www.imation.com/en, "Secure Managed USB Flash Drive / Imation Enterprise Powered by IronKey", accessed on Jan. 30, 2013, 2 pages.

*Primary Examiner* — Backhean Tiv
*Assistant Examiner* — Linh T. Nguyen
(74) *Attorney, Agent, or Firm* — Winstead PC

(57) ABSTRACT

In one embodiment, a method includes detecting a recordable transfer event on a source device. The recordable transfer event comprises a transfer of data between the source device and one or more destination devices in a peer-to-peer network. The method further includes generating, on the source device, a log of the recordable transfer event. In addition, the method includes, responsive to a determination that the source device lacks an infrastructure network connection, transmitting the log to at least one destination device so that the at least one destination device can report the log to a reporting node.

16 Claims, 3 Drawing Sheets

(58) Field of Classification Search
CPC .... H04L 69/40; A63F 13/12; A63F 2300/408;
A63F 2300/5533; A63F 2300/5546; G06F
2221/0775; G06F 17/30144; G06F
17/30165; G06F 21/606; G06F 11/3476;
G06F 17/30194; G06F 17/30489; G06F
1/3203; G06F 1/3278; G06F 1/3287;
G06F 11/2028; G06F 11/2025; G06F
11/2097; G06F 11/2023; G06F 3/1287;
G06F 2201/86; G06F 11/1471; G06F
11/3636; H04W 24/02; H04W 12/08;
H04W 40/00; H04W 8/245; H04W 92/18;
H04W 88/08; H04W 8/005; H04W 4/80;
H04W 88/04; H04W 28/18; H04W 40/24;
H04W 4/70; H04W 88/02; G06Q
20/3829; G06Q 20/4014; G06Q 20/405
USPC ....... 709/203, 209, 224, 227, 219, 217, 228,
709/201, 202, 218, 204, 230, 238, 244,
709/231, 205; 702/224, 238, 217, 219,
702/227, 228; 370/401, 254; 705/3, 67,
705/75; 714/20, 15, 4.11, E11.008,
714/E11.072, E11.08, 13, 48, 6.3;
707/672; 455/423, 406, 73, 86, 334, 405,
455/410, 411, 432.1, 433, 436, 437, 449,
455/457, 67.11
See application file for complete search history.

(56) References Cited

U.S. PATENT DOCUMENTS

| | | | | |
|---|---|---|---|---|
| 7,522,591 | B2* | 4/2009 | Kiyoto | H04L 67/322 370/389 |
| 8,316,237 | B1* | 11/2012 | Felsher | H04L 9/0825 380/282 |
| 8,321,494 | B2 | 11/2012 | Ferguson et al. | |
| 8,341,263 | B2 | 12/2012 | Chambers et al. | |
| 8,364,682 | B1* | 1/2013 | Gershony et al. | 707/739 |
| 8,874,032 | B2* | 10/2014 | Yang | 455/41.1 |
| 2003/0217135 | A1* | 11/2003 | Chatani | A63F 13/12 709/223 |
| 2004/0039781 | A1* | 2/2004 | LaVallee et al. | 709/205 |
| 2004/0039829 | A1* | 2/2004 | Bucher | H04L 63/083 709/229 |
| 2004/0122865 | A1* | 6/2004 | Stahl et al. | 707/104.1 |
| 2004/0246921 | A1* | 12/2004 | Bates | H04L 67/104 370/329 |
| 2006/0005026 | A1* | 1/2006 | Song | H04L 9/0844 713/173 |
| 2006/0075106 | A1* | 4/2006 | Hochmuth et al. | G06F 15/16 709/227 |
| 2006/0136424 | A1* | 6/2006 | Nuggehalli et al. | G06F 7/00 |
| 2006/0159109 | A1* | 7/2006 | Lamkin et al. | 370/401 |
| 2006/0167932 | A1* | 7/2006 | Vertes | G06F 11/1438 |
| 2006/0212542 | A1* | 9/2006 | Fang et al. | G06F 15/16 709/219 |
| 2006/0230072 | A1* | 10/2006 | Partovi | G06F 19/322 |
| 2006/0248337 | A1* | 11/2006 | Koodli | H04L 63/0272 713/171 |
| 2007/0053382 | A1* | 3/2007 | Bevan | H04L 41/0893 370/469 |
| 2007/0174688 | A1* | 7/2007 | Vertes | G06F 11/00 714/13 |
| 2007/0220155 | A1* | 9/2007 | Nalla | H04L 67/141 709/227 |
| 2007/0255822 | A1* | 11/2007 | Thiel et al. | 709/224 |
| 2008/0010372 | A1* | 1/2008 | Khedouri | G06F 17/30094 709/224 |
| 2008/0195750 | A1* | 8/2008 | Sadovsky | G06F 21/78 709/234 |
| 2009/0024754 | A1* | 1/2009 | Setton et al. | 709/231 |
| 2009/0264098 | A1 | 10/2009 | Lo et al. | |
| 2009/0285107 | A1* | 11/2009 | Sakurai et al. | H04L 12/26 370/242 |
| 2009/0287837 | A1* | 11/2009 | Felsher | G06F 19/322 709/229 |
| 2010/0042413 | A1* | 2/2010 | Simpson et al. | 704/270 |
| 2010/0097969 | A1* | 4/2010 | De Kimpe et al. | G08C 17/00 370/311 |
| 2010/0153578 | A1* | 6/2010 | Van Gassel | H04L 65/607 709/231 |
| 2010/0208701 | A1* | 8/2010 | Tinnakornsrisuphap et al. | 370/331 |
| 2010/0257593 | A1* | 10/2010 | Avelo et al. | 726/4 |
| 2011/0047414 | A1* | 2/2011 | Kudo | G06F 11/079 714/37 |
| 2011/0060721 | A1* | 3/2011 | Chalouhi | H04L 67/104 707/622 |
| 2011/0145423 | A1* | 6/2011 | Burns et al. | 709/228 |
| 2011/0223860 | A1 | 9/2011 | Lo et al. | |
| 2011/0231661 | A1* | 9/2011 | Ramakrishnan | H04L 63/0407 713/171 |
| 2011/0246460 | A1* | 10/2011 | Hsieh | G06Q 30/02 707/736 |
| 2011/0314138 | A1* | 12/2011 | Kobayashi | G06F 11/3476 709/222 |
| 2011/0314153 | A1* | 12/2011 | Bathiche | H04L 63/08 709/225 |
| 2012/0023209 | A1* | 1/2012 | Fletcher | H04L 12/40195 709/223 |
| 2012/0042197 | A1* | 2/2012 | Peng | G06F 11/2035 714/4.12 |
| 2012/0244832 | A1 | 9/2012 | Carlander | |
| 2013/0061091 | A1* | 3/2013 | Moore | G06F 11/1443 714/18 |
| 2013/0114596 | A1* | 5/2013 | Clack | H04L 12/1836 370/390 |

* cited by examiner

SYSTEM AND METHOD FOR REPORTING PEER-TO-PEER TRANSFER EVENTS

BACKGROUND

Technical Field

The present invention relates generally to information security and more particularly, but not by way of limitation, to systems and methods for reporting transfer events that occur in a peer-to-peer network.

History of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As a result of advances in communications technology, peer-to-peer (P2P) communication between information handling systems is becoming easier and more prevalent. P2P communication can occur via numerous methods including, for example, Wi-Fi Direct, WiGig, and Bluetooth. This ease and prevalence, however, highlights audit compliance and reporting concerns. P2P communication is a quick way for sensitive data to slip out of a corporate environment without any record of its destination. This problem is exacerbated by the fact that P2P communication often occurs without any network link to the corporate environment. Consequently, safeguards are clearly needed.

SUMMARY OF THE INVENTION

In one embodiment, a method includes detecting a recordable transfer event on a source device. The recordable transfer event comprises a transfer of data between the source device and one or more destination devices in a peer-to-peer network. The method further includes generating, on the source device, a log of the recordable transfer event. In addition, the method includes, responsive to a determination that the source device lacks an infrastructure network connection, transmitting the log to at least one destination device so that the at least one destination device can report the log to a reporting node.

In one embodiment, an information handling system includes a network interface operable to enable peer-to-peer communication. The information handling system further includes a processing unit communicably coupled to the network interface. The processing unit is operable to detect a recordable transfer event. The recordable transfer event comprises a transfer of data between the information handling system and one or more destination devices in a peer-to-peer network. The processing unit is further operable to generate a log of the recordable transfer event. In addition, responsive to a determination that the information handling system lacks an infrastructure network connection, the processing unit is operable to transmit the log to at least one destination device so that the at least one destination device can report the log to a reporting node.

In one embodiment, a computer-program product includes a computer-usable medium having computer-readable program code embodied therein, the computer-readable program code adapted to be executed to implement a method. The method includes detecting a recordable transfer event on a source device. The recordable transfer event comprises a transfer of data between the source device and one or more destination devices in a peer-to-peer network. The method further includes generating a log of the recordable transfer event. In addition the method includes, responsive to a determination that the source device lacks an infrastructure network connection, transmitting the log to at least one destination device so that the at least one destination device can report the log to a reporting node.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1:
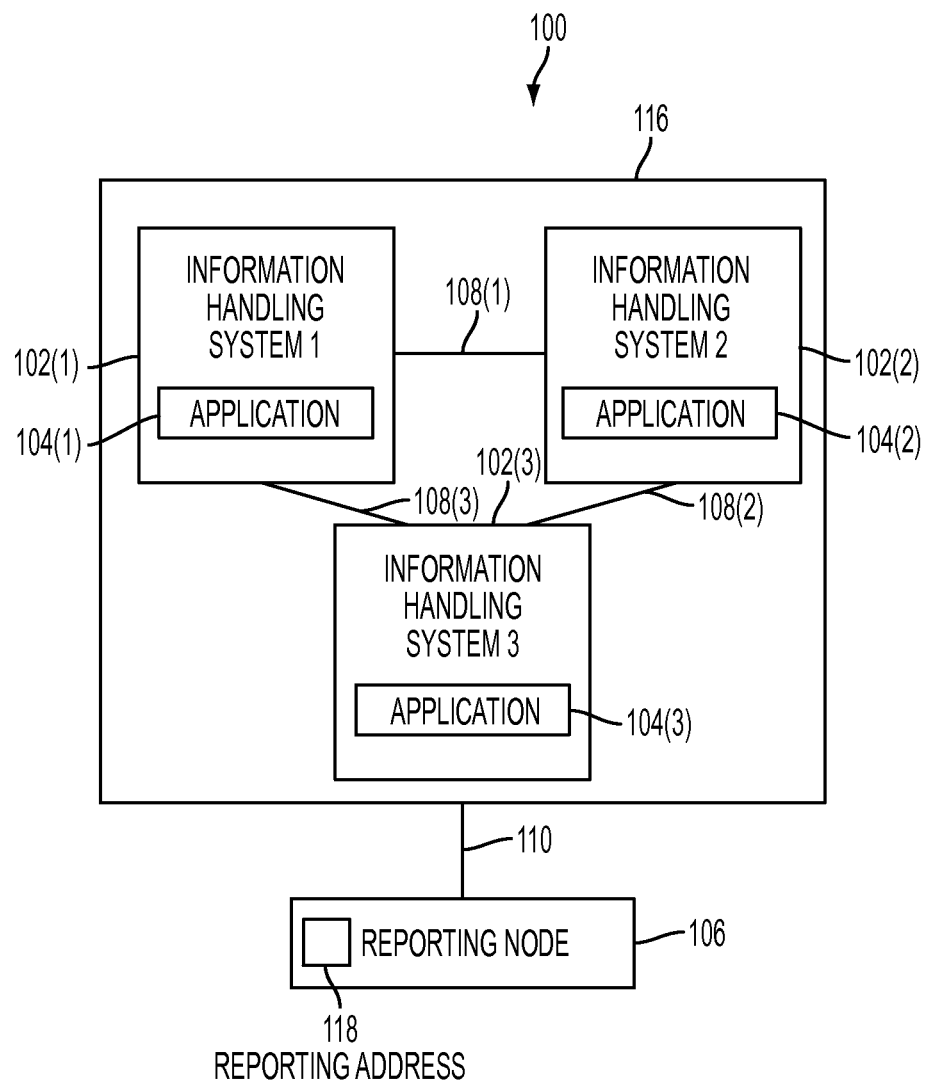
FIG. 1 illustrates a system for reporting recordable transfer events.

In various embodiments, information security in peer-to-peer (P2P) communication can be more easily logged, reported, and audited via systems and methods described herein. In a typical embodiment, recordable transfer events can be logged and reported to a reporting node in dependence on which of a plurality of information handling systems first obtains an infrastructure network connection.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

A recordable transfer event, as used herein, is a communication that transfers data deemed sensitive by a transfer application from a source device to one or more destination devices. In various embodiments, what constitutes a recordable transfer event can be configurable, for example, by an administrator. An infrastructure network connection, as used herein, is a network connection sufficient to report a recordable transfer event, for example, to a reporting node. A transfer application, as used herein, is a software application that is operable to facilitate P2P communication and report recordable transfer events to a reporting node. A reporting node, as used herein, is a network location to which recordable transfer events can be reported. The network location can be represented, for example, by a reporting address. For example, the network location can be on a public network, a private corporate network, a virtual private network, or the like.

A source device, as used herein, is an information handling system from which data is transferred, for example, as part of a recordable transfer event. A destination device, as used herein, is an information handling system at which data is received, for example, as all or part of a recordable transfer event. A spectator device, as used herein, refers to an information handling system that is not a source device or a destination device relative to a given recordable transfer event but that is either connected or connectable to the source device. For purposes of this patent application, source devices and destination devices relative to a recordable transfer event are considered participants in the recordable transfer event. In addition, for purposes of this patent application, spectator devices are considered non-participants in the recordable transfer event.

FIG. 1 illustrates a system 100 for reporting recordable transfer events. The system 100 includes a P2P network 116 and a reporting node 106. The P2P network includes an information handling system 102(1), an information handling system 102(2), and an information handling system 102(3) (collectively, information handling systems 102). For illustrative purposes, the P2P network 116 is shown to include three information handling systems (i.e., the information handling systems 102). However, it should be appreciated that, in practice, the P2P network 116 can include any number of information handling systems. The information handling systems 102(1), 102(2), and 102(3) have loaded and executing thereon a transfer application 104(1), a transfer application 104(2), and a transfer application 104(3), respectively (collectively, transfer applications 104). The reporting node 106 has a reporting address 118 that identifies its network location. The reporting address 118 can be, for example, an Internet Protocol (IP) address or a domain-name translation thereof.

In a typical embodiment, the transfer applications 104 manage establishment of and communication over a P2P link 108(1), a P2P link 108(2), and a P2P link 108(3) (collectively, P2P links 108). More particularly, the information handling system 102(1) and the information handling system 102(2) are connected by the P2P link 108(1), the information handling system 102(2) and the information handling system 102(3) are connected by the P2P link 108(2), and the information handling system 102(1) and the information handling system 102(3) are connected by the P2P link 108(3). In a typical embodiment, the P2P links 108 enable P2P communication between connected ones of the information handling systems 102. For example, in various embodiments, the P2P links 108 can represent connections established via WiFi direct. However, it should be appreciated that any other method of P2P communication can also be utilized.

The P2P network 116 is shown to be connected to the reporting node 106 via an infrastructure network connection 110. The infrastructure network connection 110 abstracts one or more individual network connections that may be established from the information handling systems 102 to the reporting node 106. The reporting node 106 enables such network connections via the reporting address 118. The infrastructure network connection 110 can be established via Internet connectivity as provided, for example, by cellular or WiFi service. Exemplary operation of the system 100 will be described in greater detail with respect to FIGS. 2-3.

Figure 2:
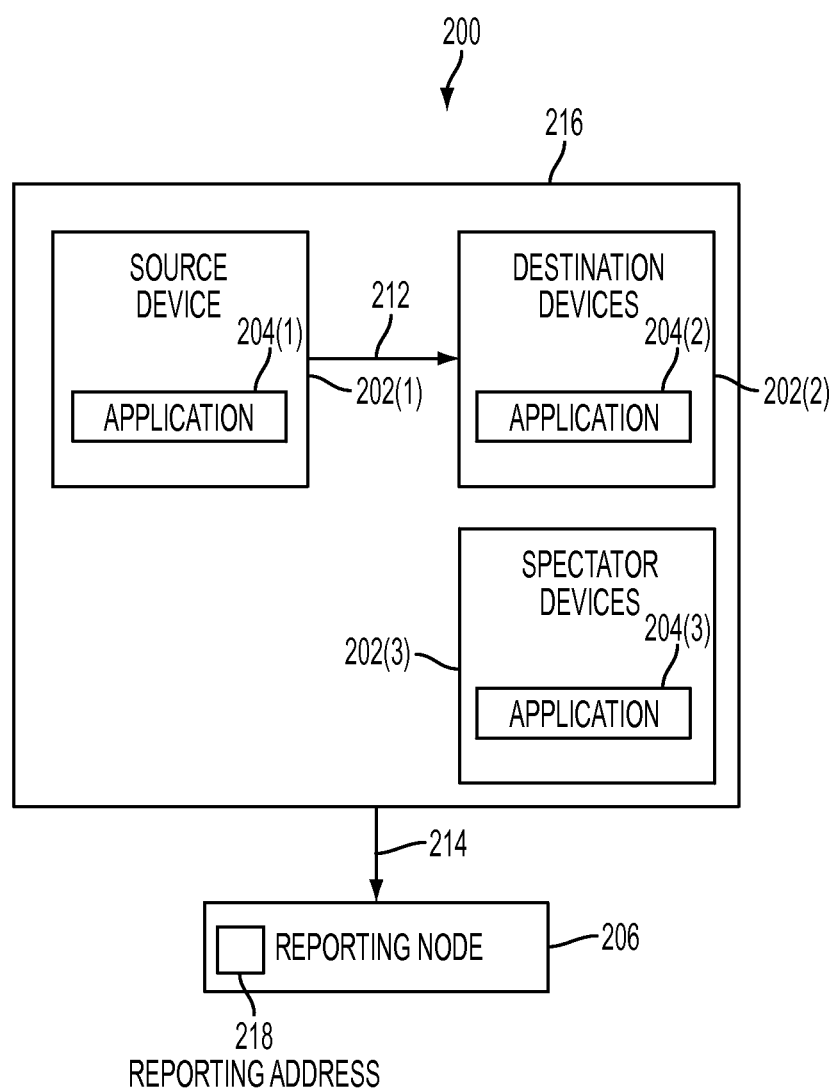
FIG. 2 illustrates a system for reporting recordable transfer events.

FIG. 2 illustrates a system 200 for reporting recordable transfer events. The system 200 includes a P2P network 216 and a reporting node 206. In a typical embodiment, the P2P network 216 and the reporting node 206 operate as described with respect to the P2P network 116 and the reporting node 106, respectively, of FIG. 1. The P2P network 216 includes a source device 202(1), one or more destination devices 202(2), and one or more spectator devices 202(3). The source device 202(1), each of the one or more destination devices 202(2), and each of the one or more spectator devices 202(3) have loaded and executing thereon a transfer application 204(1), a transfer application 204(2), and a transfer application 204(3), respectively (collectively, the transfer applications 204). The reporting node 206 has a reporting address 118 that identifies its network location. The reporting address 218 can be, for example, an Internet Protocol (IP) address or a domain-name translation thereof.

In operation, the transfer applications 204 identify and facilitate a recordable transfer event 212. As shown, the recordable transfer event 212 is a transfer of data from the source device 202(1) to the one or more destination devices 202(2). The recordable transfer event can be, for example, a file transfer, a print operation (e.g., WiFi-direct printing), screen sharing (e.g., WiFi-display functionality), or the like. The transfer application 204(1) facilitates transfer of the data by the source device 202(1). In similar fashion, the transfer application 204(2) facilitates receipt of the data by the one or more destination devices 202(2). A report 214 of the recordable transfer event 212 is sent from a device of the P2P network 216 to the reporting node 206. In a typical embodiment, all transfers of the report 214 are as an encrypted communication that can only be decrypted by the reporting node 206. The report 214 can be, for example, a log as described with respect to FIG. 3. Exemplary operation of the system 200 will be described with respect to FIG. 3.

Figure 3:
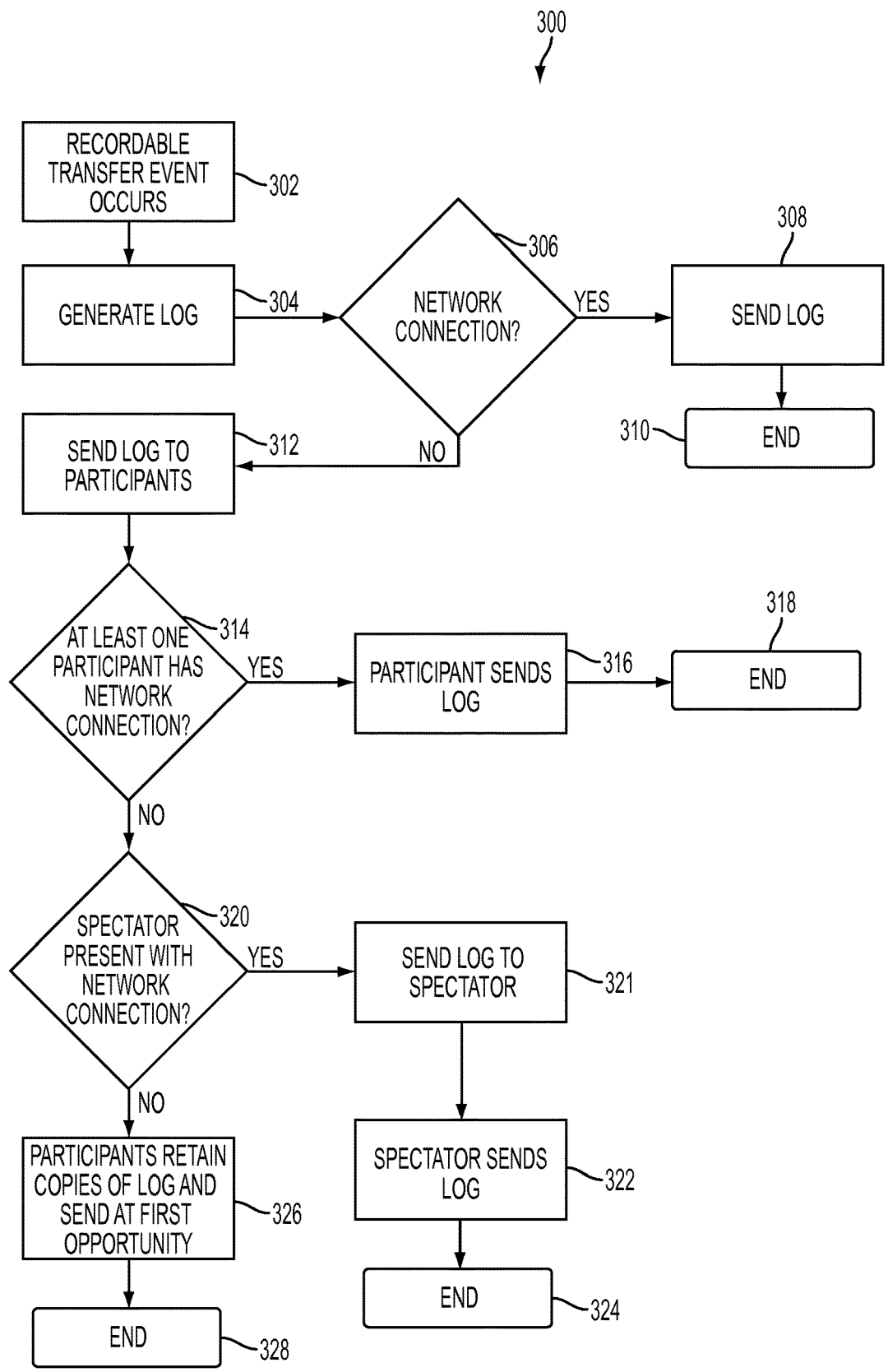
FIG. 3 illustrates a process that facilitates reporting of a recordable transfer event.

FIG. 3 illustrates a process 300 that facilitates reporting of a recordable transfer event such as, for example, the recordable transfer event 212 of FIG. 2, to a reporting node. In a typical embodiment, the recordable transfer event is a transfer of data from a source device to one or more destination devices. As described with respect to FIGS. 1-2, the source device, each of the one or more destination devices, and any spectator devices have a transfer application loaded and executing thereon. In addition, as described with respect to FIGS. 1-2, the reporting node has a reporting address identifying a network location to which reports should be sent. In a typical embodiment, the process 300 is executed by a combination of the source device, the one or more destination devices, and any spectator devices. The process 300 begins at step 302.

At step 302, the recordable transfer event occurs. The recordable transfer event can be, for example, a file transfer, a print operation (e.g., WiFi-direct printing), screen sharing, or the like. From step 302, the process 300 proceeds to step 304. At step 304, the transfer application on the source device generates a log. Table 1 below illustrates exemplary data that may be included in the log.

TABLE 1

| Field | Field Description |
| --- | --- |
| Log ID | Identification of Log (allows deduplication by reporting node in cases where multiple devices report a same log). |
| SourceUser | Identification of user logged in on source device when recordable event occurred. |
| SourceDevice | Identification of the source device. |
| ActionType | Type of Recordable Transfer Event (e.g., file transfer, print operation, screen sharing, etc.) |
| ActionOnFile | Identification of file that is the subject of the recordable transfer event. The identification can include a file name, a set of metadata (e.g., a content classification for the file). |
| DestinationUser[n] | Identification of user logged in on each destination device when the recordable transfer event occurred. |
| DestinationDevice[n] | Identification of each destination device. |
| SpectatorUser[n] | Identification of user logged in on each spectator device when the recordable transfer event occurred. |
| SpectatorDevice[n] | Identification of each spectator device. |
| Result | Identifies a result of the recordable transfer event (e.g., success or an error code) |
| Timestamp | A timestamp for the recordable transfer event. |

From step 304, the process 300 proceeds to step 306. At step 306, the transfer application on the source device determines whether the source device has an infrastructure network connection. If so, the process 300 proceeds to step 308. At step 308, the transfer application on the source device sends the log to the reporting node via the source device's infrastructure network connection. From step 308, the process 300 proceeds to step 310 where the process 300 ends.

If it is determined at step 306 that the source device does not have an infrastructure network connection, the process 300 proceeds to step 312. At step 312, the transfer application on the source device sends the log to all participants in the recordable transfer event. In a typical embodiment, the participants include, in addition to the source device, the one or more destination devices. Therefore, step 312 typically entails sending the log to the one or more destination devices. From step 312, the process 300 proceeds to step 314.

At step 314, the transfer application on the source device determines whether any participant has an infrastructure network connection. This is typically determined by communicating with the transfer application loaded and executing on each of the one or more destination devices. If it is determined that at least one participant has a network connection, the process 300 proceeds to step 316. At step 316, the at least one participant, via the transfer application loaded and executing thereon, sends the log to the reporting node. From step 316, the process 300 proceeds to step 318. At step 318, the process 300 ends.

If it is determined at step 314 that there is not at least one participant that has an infrastructure network connection, the process 300 proceeds to step 320. At step 320, the transfer application on the source device determines whether there is at least one spectator device that has an infrastructure network connection. If so, the process 300 proceeds to step 321. At step 321, the transfer application on the source device sends the log to the at least one spectator device. From step 321, the process 300 proceeds to step 322. At step 322, the at least one spectator device, via the transfer application loaded and executing thereon, sends the log to the reporting node. From step 322, the process 300 proceeds to step 324. At step 324, the process 300 ends.

If it is determined at step 320 that there is not at least one spectator device that has an infrastructure network connection, the process 300 proceeds to step 326. At step 326, all participants (i.e., the source device and the one or more destination device) retain the log and send to the reporting node when an infrastructure network connection is attained. From step 326, the process 300 proceeds to step 328. At step 328, the process 300 ends.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, by a computer comprising at least one processor:
   detecting a recordable transfer event on a source device;
   wherein the recordable transfer event comprises a transfer of data between the source device and a destination device in a peer-to-peer network, wherein the destination device comprises a central processing unit;
   wherein the peer-to-peer network comprises a spectator device that is a non-participant to the recordable transfer event;
   generating a log of the recordable transfer event;
   determining, by a transfer application on the source device, whether the source device has an Internet connection;
   responsive to a determination that the source device has the Internet connection, reporting the log to a reporting node that is external to the peer-to-peer network, wherein the reporting the log to the reporting node is performed via the Internet connection and comprises an encrypted communication;
   responsive to a determination that the source device lacks the Internet connection determining, by the transfer application on the source device, whether the destination device has the Internet connection;
   responsive to a determination that the destination device has the Internet connection, transmitting the log to the destination device so that the destination device can report the log to the reporting node;
   responsive to a determination that the destination device lacks the Internet connection, determining, by the transfer application on the source device, whether the spectator device has the Internet connection;
   responsive to a determination that the spectator device has the Internet connection, transmitting the log to the spectator device so that spectator device can report the log to the reporting node; and
   responsive to a determination that the spectator device lacks the Internet connection, retaining the log so that the log can be reported to the reporting node when the Internet connection is obtained.

2. The method of claim 1, wherein the peer-to-peer network is established via WiFi direct.

3. The method of claim 1, wherein a network location of the reporting node is identified via a reporting address.

4. The method of claim 1, wherein:
the recordable transfer event comprises at least one selected from the group consisting of:
a print operation, a file transfer, and a screen share; and
an action type of the recordable transfer event is identified in the log.

5. The method of claim 1, wherein the log comprises a log ID entry so that the reporting node can deduplicate received logs.

6. The method of claim 1, wherein the log identifies the source device and the at least one destination device.

7. The method of claim 1, wherein the log identifies a user logged in to each of the source device and the at least one destination device when the recordable transfer event occurred.

8. The method of claim 1, wherein the log identifies the at least one spectator device and a user of the at least one spectator device.

9. The method of claim 1, wherein the log identifies a file that is a subject of the recordable transfer event.

10. An information handling system, comprising:
at least one processor;
random access memory (RAM);
a network interface operable to enable peer-to-peer communication on a peer-to-peer network;
wherein the peer-to-peer network comprises a spectator device;
a central processing unit communicably coupled to the network interface, wherein the central processing unit is operable to:
detect a recordable transfer event, wherein the spectator device is a non-participant to the recordable transfer event;
wherein the recordable transfer event comprises a transfer of data between the information handling system and a destination device in the peer-to-peer network;
generate a log of the recordable transfer event;
determine whether the information handling system has an Internet connection;
responsive to a determination that the information handling system has the Internet connection, report the log to a reporting node that is external to the peer-to-peer network, wherein the reporting the log to the reporting node is performed via the Internet connection and comprises an encrypted communication;
responsive to a determination that the information handling system lacks the Internet connection determine whether the destination device has the Internet connection;
responsive to a determination that the destination device has the Internet connection, transmit the log to the destination device so that the destination device can report the log to the reporting node;
responsive to a determination that the destination device lacks the Internet connection, determine whether the spectator device has the Internet connection;
responsive to a determination that the spectator device has the Internet connection, transmit the log to the spectator device so that spectator device can report the log to the reporting node; and
responsive to a determination that the spectator device lacks the Internet connection, retaining the log so that the log can be reported to the reporting node when the Internet connection is obtained.

11. The information handling system of claim 10, wherein the peer-to-peer network is established via WiFi direct.

12. The information handling system of claim 10, wherein a network location of the reporting node is identified via a reporting address.

13. The information handling system of claim 10, wherein:
the recordable transfer event comprises at least one selected from the group consisting of:
a print operation, a file transfer, and a screen share; and
an action type of the recordable transfer event is identified in the log.

14. The information handling system of claim 10, wherein the log comprises a log ID entry so that the reporting node can deduplicate received logs.

15. The information handling system of claim 10, wherein the log identifies the information handling system, the at least one destination device, and a user logged in to each of the information handling system and the at least one destination device when the recordable transfer event occurred.

16. A computer-program product comprising a non-transitory computer-usable medium having computer-readable program code embodied therein, the computer-readable program code adapted to be executed to implement a method comprising:
detecting a recordable transfer event on a source device, wherein the source device comprises a central processing unit;
wherein the recordable transfer event comprises a transfer of data between the source device and a destination device in a peer-to-peer network, wherein the destination device comprises a central processing unit;
wherein the peer-to-peer network comprises a spectator device that is a non-participant to the recordable transfer event;
generating a log of the recordable transfer event;
determining, by a transfer application on the source device, whether the source device has an Internet connection;
responsive to a determination that the source device has the Internet connection, reporting the log to a reporting node that is external to the peer-to-peer network, wherein the reporting the log to the reporting node is performed via the Internet connection and comprises an encrypted communication;
responsive to a determination that the source device lacks the Internet connection determining, by the transfer application on the source device, whether the destination device has the Internet connection;
responsive to a determination that the destination device has the Internet connection, transmitting the log to the destination device so that the destination device can report the log to the reporting node;
responsive to a determination that the destination device lacks the Internet connection, determining, by the transfer application on the source device, whether the spectator device has the Internet connection;
responsive to a determination that the spectator device has the Internet connection, transmitting the log to the spectator device so that spectator device can report the log to the reporting node; and
responsive to a determination that the spectator device lacks the Internet connection, retaining the log on the source device so that the log can be reported to the reporting node when the Internet connection is obtained.

\* \* \* \* \*